(12) United States Patent
Yamada et al.

(10) Patent No.: US 9,689,746 B2
(45) Date of Patent: Jun. 27, 2017

(54) METHOD AND SYSTEM OF MEASURING SURFACE TEMPERATURE

(75) Inventors: Yoshiro Yamada, Ibaraki (JP); Juntaro Ishii, Ibaraki (JP)

(73) Assignee: NATIONAL INSTITUTE OF ADVANCED INDUSTRIAL SCIENCE AND TECHNOLOGY, Tokyo (JP)

( * ) Notice: Subject to any disclaimer, the term of this patent is extended or adjusted under 35 U.S.C. 154(b) by 822 days.

(21) Appl. No.: 13/993,468

(22) PCT Filed: Dec. 9, 2011

(86) PCT No.: PCT/JP2011/078536
§ 371 (c)(1),
(2), (4) Date: Jul. 8, 2013

(87) PCT Pub. No.: WO2012/081512
PCT Pub. Date: Jun. 21, 2012

(65) Prior Publication Data
US 2013/0294480 A1     Nov. 7, 2013

(30) Foreign Application Priority Data

Dec. 13, 2010 (JP) ............................... P2010-276899
Dec. 13, 2010 (JP) ............................... P2010-276941

(51) Int. Cl.
*G01J 5/00* (2006.01)
*G01J 5/02* (2006.01)
(Continued)

(52) U.S. Cl.
CPC . *G01J 5/02* (2013.01); *G01J 5/46* (2013.01); *G01J 5/522* (2013.01)

(58) Field of Classification Search
CPC .................. G01J 5/02; G01J 5/46; G01J 5/522
See application file for complete search history.

(56) References Cited

U.S. PATENT DOCUMENTS 7,155,363 B1 * 12/2006 Rosenthal ............. G01J 5/0003
702/132

FOREIGN PATENT DOCUMENTS

JP          47-33722 A      10/1972
JP          4-242129     *   8/1992
(Continued)

OTHER PUBLICATIONS

English translation of Written Opinion issued Jan. 17, 2012, in PCT International Application No. PCT/JP2011/078536.
(Continued)

*Primary Examiner* — Lisa Caputo
*Assistant Examiner* — Janice M Soto
(74) *Attorney, Agent, or Firm* — Birch, Stewart, Kolasch & Birch, LLP

(57) ABSTRACT

Provided is a measuring method capable of accurately measuring the surface temperature of a surface to be measured, uninfluenced by the emissivity distribution of the surface to be measured. A surface to be measured having an emissivity distribution, a radiometer that measures a radiance distribution of the surface to be measured, and an auxiliary heat source installed in a specular reflection position from the radiometer with respect to the surface to be measured are prepared, radiances of two places having different emissivities of the surface to be measured are measured at two different auxiliary-heat-source temperatures, a reflectance ratio of the two places having the different emissivities is calculated on the basis of two measured radiances of the two places having the different emissivities, and temperature of the surface to be measured is obtained using reflectance ratio and measured radiances of the two places having different emissivities.

3 Claims, 4 Drawing Sheets

(51) Int. Cl.
*G01J 5/46* (2006.01)
*G01J 5/52* (2006.01)

(56) References Cited

FOREIGN PATENT DOCUMENTS

| | | |
|---|---|---|
| JP | 4-242129 A | 8/1992 |
| JP | 2001318003 * | 11/2001 |
| JP | 3939487 B2 | 4/2007 |
| JP | 2009-202495 A | 9/2009 |

OTHER PUBLICATIONS

International Search Report issued Jan. 17, 2012, in PCT International Application No. PCT/JP2011/078536.
Kelsall, D., "An automatic emissivity-compensated radiation pyrometer," J. Sci. Instrum (1963), vol. 40, pp. 1-2.

* cited by examiner

2: AUXILIARY HEAT SOURCE: SURFACE BLACK BODY
1: OBJECT TO BE MEASURED
3: THERMAL IMAGING DEVICE

METHOD AND SYSTEM OF MEASURING SURFACE TEMPERATURE

TECHNICAL FIELD

The present invention relates to a method and a system of measuring surface temperature.

BACKGROUND ART

When object temperature is measured by radiation thermometry using a two-dimensional thermal imaging device or a one-dimensional scanning thermometer, normally, the emissivity of an object or the distribution thereof is unknown and changes depending on measurement conditions and the surface state. Thus, information of accurate surface temperature or temperature distribution can not be obtained from radiance detected by the thermal imaging device or the scanning radiation thermometer.

Moreover, even if the material emissivity of each area to be measured is known, in the case where fine emissivity distribution is present, there is also a problem in that apparent emissivity is different from the known emissivity due to the limitations of the imaging characteristics of the thermal imaging device.

In addition, various attempts have been made to correct for unknown emissivity, but unfortunately, there is no method suitable for measurement responding to a fast-changing object temperature.

The following methods have been previously applied to measure the temperature of an object whose emissivity is unknown in a non-contact manner by a radiation thermometer or a thermal imaging device.

(1) A method of measuring the radiance distribution after heating an object to a known temperature using a heater, in order to find the emissivity distribution of an object to be measured.

(2) A method of detecting two polarizations of a light beam in a spot-type radiation temperature measurement, measuring the object reflectance ratio in the two polarizations, and correcting emissivity from the ratio, as an emissivity correction technique in FLA (see Patent Document 1).

(3) A method of superimposing reflected light from a blackbody auxiliary radiating source on the object, regulating the temperature of the auxiliary radiation source so that the sum of the thermal radiance from the object and the reflected radiance from the object becomes equal to thermal radiance from the auxiliary radiating source, and measuring the temperature of the auxiliary radiating source at that time using a contact-type thermometer to determine the object temperature from the measured temperature (see Non-Patent Document 1).

(4) A method for obtaining the true object temperature through an arithmetic operation from measured radiances of a high-emissivity portion and a low-emissivity portion using an infrared radiation thermometer or a thermography capable of simultaneously measuring two or more points before and after changing the environmental temperature by means of an environmental radiance temperature switching device, such as a thermal infrared source as an auxiliary heat source before which a shutter is attached (see Patent Document 2).

However, each of these related arts have problems in the following points.

The method of (1) requires an additional process of heating the object using the heater and, in addition, a means to detect the object temperature at this time.

In the method of (2), polarizing optical elements are required, and thus the application of this method to long-wavelength infrared light used in low temperature radiation thermometry results in high cost. In addition, this method is not suitable for surface distribution measurement.

In the method of (3), the auxiliary radiation source is required to be a blackbody, but it is difficult to obtain a satisfactory blackbody having a planer form. When the auxiliary radiation source is not a blackbody, correction is required, but sufficient accuracy is not obtained. In addition, it is required to measure both the auxiliary radiating source and the object to be measured, and the above method cannot be applied to a case where a fast-changing object temperature is measured. In addition, the system structure becomes complicated.

In the method of (4), it is required to measure the temperature while switching the environmental temperature in a step form. The above method is not therefore suitable for measuring a fast-changing object temperature. In addition, the system becomes complicated.

RELATED DOCUMENT

Patent Document

[Patent Document 1] Japanese Patent Application No. 2009-202495
[Patent Document 2] Japanese Patent No. 3939487

Non-Patent Document

[Non-Patent Document 1] J. Sci. Instrum., 1963, Vol 40, 1-4

DISCLOSURE OF THE INVENTION

The first task of the present invention is to provide a measuring method and a measuring system that are capable of accurately measuring a fast-changing surface temperature of a surface to be measured, without using an expensive optical element, being immune to the emissivity distribution of the surface to be measured.

In addition, the second task of the present invention is to provide a measuring method and a measuring system that are capable of accurately measuring the temperature of a surface to be measured being immune to the emissivity distribution of the surface to be measured, without expensive optical elements or a structurally-complex device.

According to the first aspect of the present invention, the following method and system of measuring the surface temperature are provided in order to solve the first task.

(1) A method of measuring surface temperature, including: preparing a surface to be measured that has an emissivity distribution, a radiometer that measures a radiance distribution of the surface to be measured, and an auxiliary heat source installed in a specular reflection position from the radiometer with respect to the surface to be measured; measuring radiances of two places having different emissivities of the surface to be measured at two different auxiliary-heat-source temperatures; calculating a reflectance ratio between the two places having the different emissivities on the basis of two measured radiances of the two places having the different emissivities; and obtaining the temperature of the surface to be measured, using the reflectance ratio and the measured radiances of the two places having the different emissivities.

(2) A system of measuring surface temperature, including: a surface to be measured that has an emissivity distribution;

a radiometer that measures a radiance distribution of the surface to be measured; and an auxiliary heat source installed in a specular reflection position from the radiometer with respect to the surface to be measured, wherein radiances of two places having different emissivities of the surface to be measured are measured at two different auxiliary-heat-source temperatures, a reflectance ratio between the two places having the different emissivities is calculated on the basis of two measured radiances of the two places having the different emissivities, and the temperature of the surface to be measured is obtained using the reflectance ratio and the measured radiances of the two places having the different emissivities.

(3) The system of measuring surface temperature according to the above (2), wherein the radiometer that measures a radiance distribution is a thermal imaging device or a one-dimensional scanning radiometer.

According to the second aspect of the present invention, the following method and system of measuring surface temperature is provided in order to solve the second task.

(4) A method of measuring surface temperature, including: preparing a surface to be measured that has an emissivity distribution, a radiometer that measures a radiance distribution of the surface to be measured, and a radiance-variable auxiliary heat source installed in a specular reflection position from the radiometer with respect to the surface to be measured; changing radiance of the auxiliary heat source so that measured radiances of a high-emissivity portion and a low-emissivity portion of the surface to be measured become equal to each other; and obtaining the temperature of the surface to be measured from the measured radiances at that time.

(5) A system of measuring surface temperature, including: a surface to be measured that has an emissivity distribution; a radiometer that measures a radiance distribution of the surface to be measured; and a radiance-variable auxiliary heat source installed in a specular reflection position from the radiometer with respect to the surface to be measured, wherein a radiance of the auxiliary heat source is changed so that the measured radiances of a high-emissivity portion and a low-emissivity portion of the surface to be measured become equal to each other, and the temperature of the surface to be measured is obtained from the measured radiances at that time.

(6) The system of measuring surface temperature according to the above (5), wherein the radiometer that measures the radiance distribution is a thermal imaging device or a one-dimensional scanning radiometer.

According to the present invention, surface temperature distribution can be accurately measured without being influenced by the emissivity distribution of the object, in a surface temperature distribution measurement intended for heating area identification and generated heat measurement within a semiconductor device or within a circuit component using a power device, or a surface temperature distribution measurement intended for plant facility inspection or defect detection of a building structure. In addition, according to the first aspect of the present invention, accurate measurement is possible of a fast-changing surface temperature distribution. In addition, according to the second aspect of the present invention, surface temperature measurement is possible without using a structurally-complex device.

In addition, the object temperature can be accurately measured without being influenced by the blurring of the imaging, even for an object to be measured such as an electronic device having a fine emissivity pattern approaching the limit of the imaging capabilities of the thermal imaging device.

DESCRIPTION OF EMBODIMENTS (Principle of the Present Invention)

When radiance distribution is measured by a thermal imaging device with attention on a portion having a large variation in the emissivity distribution on the surface to be measured, the emissivity distribution is detected as the radiance distribution. Assume, at this time, that the temperature of the object is uniform in a certain region, or the temperature distribution is spatially sufficiently smooth in comparison with the emissivity distribution.

First, a first invention will be described.

Figure 1:
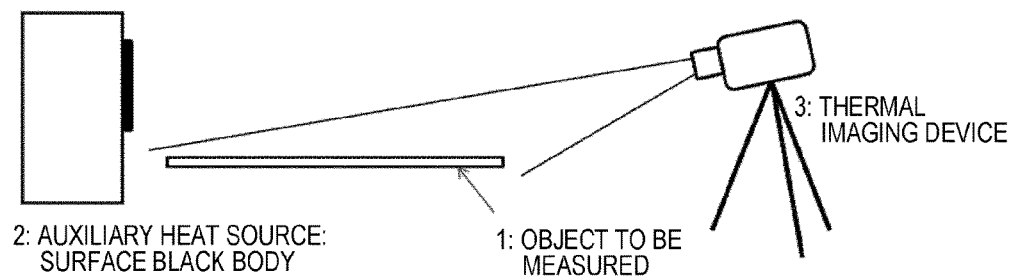
FIG. 1 is a diagram illustrating a surface-temperature measurement system according to the present invention.

As shown in FIG. 1, an auxiliary heat source 2 such as a surface blackbody is disposed at a position specular to a thermal imaging device 3 with respect to a measuring surface. The thermal radiation from the auxiliary heat source 2 is reflected on the surface of an object 1 to be measured, superimposed on thermal radiation from the object 1 to be measured, and detected by the thermal imaging device 3. When the temperature of the auxiliary heat source is changed in this state, or the auxiliary heat source is blocked by a shutter or the like, a change in the amount of reflected light proportional to the change in the amount of incident light takes place, and the radiance distribution detected by the thermal imaging device changes. Since the changes in the light intensity incident on a high-emissivity portion and a low-emissivity portion are equal to each other, the ratio between the reflectances of the high-emissivity portion and the low-emissivity portion can be obtained by calculating the ratio between the radiance changes, that is, the changes in the intensity of reflected light.

Next, the blackbody radiance is calculated using Expression (9) represented below from measured radiance of the high-emissivity portion and the low-emissivity portion and the ratio between reflectances calculated from the values. Treating the object as a blackbody of which the emissivity is 1, the object temperature is obtained by applying the Planck's law of radiation. Thus, the true temperature of the object can be found without the need for finding the object emissivity distribution.

The measurement principle of the first invention will be described below in detail.

Let the emissivities of the higher-emissivity portion and the lower-emissivity portion to be $\epsilon_{Hi}$ and $\epsilon_{Lo}$, and the reflectances thereof to be $\rho_{Hi}$ and $\rho_{Lo}$, respectively, in two places of which the emissivities of the object to be measured that has an emissivity distribution are different from each other. When the object is an opaque body, the relations $\epsilon_{Hi}+\rho_{Hi}=1$ and $\epsilon_{Lo}+\rho_{Lo}=1$ hold from the Kirchhoff's law.

When the thermal radiance of the auxiliary heat source is $L_{Heat\text{-}source,1}$, thermal radiances $S_{Hi,1}$ and $S_{Lo,1}$ of the high-emissivity portion and the low-emissivity portion are expressed by the following expressions, respectively.

$$S_{Hi,1}=\epsilon_{Hi}L(T)+\rho_{Hi}L_{Heat\text{-}source,1} \quad (1)$$

$$S_{Lo,1}=\epsilon_{Lo}L(T)+\rho_{Lo}L_{Heat\text{-}source,1} \quad (2)$$

Herein, T is the temperature of the object to be measured, and L(T) is the thermal radiance of the blackbody of temperature T.

Next, the thermal radiance of the auxiliary heat source is changed to $L_{Heat\text{-}source,2}$, and thermal radiances $S_{Hi,2}$ and $S_{Lo,2}$ of the high-emissivity portion and the low-emissivity portion are expressed by the following expressions, respectively.

$$S_{Hi,2}=\epsilon_{Hi}L(T)+\rho_{Hi}L_{Heat\text{-}source,2} \quad (3)$$

$$S_{Lo,2}=\epsilon_{Lo}L(T)+\rho_{Lo}L_{Heat\text{-}source,2} \quad (4)$$

The ratio $R_\rho$ between the reflectances of the high-emissivity portion and the low-emissivity portion can be calculated from the four measured quantities $S_{Hi,1}$, $S_{Lo,1}$, $S_{Hi,2}$, and $S_{Lo,2}$ and is obtained by the following Expression (5) derived from Expressions (1) to (4).

$$R_\rho=\rho_{Hi}/\rho_{Lo}=(S_{Hi,2}-S_{Hi,1})/(S_{Lo,2}-S_{Lo,1}) \quad (5)$$

When the relations of $\epsilon_{Hi}+\rho_{Hi}=1$ and $\epsilon_{Lo}+\rho_{Lo}=1$ are applied to Expressions (3) and (4) and are transformed, Expressions (6) and (7) are obtained.

$$S_{Hi,2}=L(T)+\rho_{Hi}(-L(T)+L_{Heat\text{-}source,2}) \quad (6)$$

$$S_{Lo,2}=L(T)+\rho_{Lo}(-L(T)+L_{Heat\text{-}source,2}) \quad (7)$$

When L(T) is subtracted from both sides of Expressions (6) and (7) and then the ratio is taken and Expression (5) is applied, Expression (8) is obtained.

$$(S_{Hi,2}-L(T))/(S_{Lo,2}-L(T))=R_\rho \quad (8)$$

When Expression (8) is transformed, L(T) can be expressed in the form of Expression (9) using $R_\rho$.

$$L(T)=(S_{Hi,2}-R_\rho S_{Lo,2})/(1-R_\rho) \quad (9)$$

The accurate temperature T is obtained from the measured radiance L(T) by treating the emissivity as 1. That is, it is possible to perform measurement in which unknown emissivity is corrected. Note that Expressions (6) to (9) are established even when $S_{Hi,2}$, $S_{Lo,2}$, and $L_{Heat\text{-}source,2}$ are replaced by $S_{Hi,1}$, $S_{Lo,1}$, and $L_{Heat\text{-}source,1}$, respectively.

Moreover, Expression (9) is a relational expression that is always established regardless of the auxiliary-heat-source radiance $L_{Heat\text{-}source}$ or the object temperature T. For this reason, the use of the ratio $R_\rho$ obtained in advance and the radiances $S_{Hi}$ and $S_{Lo}$ measured at an arbitrary timing enables calculating L(T) at that time on the basis of Expression (9), unless the reflectance ratio $R_\rho$ changes with time.

Accordingly, when measuring a phenomenon in which temperature changes fast, the measurement responding to the object temperature variation is enabled: by obtaining $R_\rho$ from the radiance measurement at two auxiliary-heat-source temperatures in steady state before starting the temperature change of the object; and by correcting the emissivity by Expression (9), using the value of this $R_\rho$ in a state where the auxiliary-heat-source radiance is unchanged after starting the temperature change of the object.

Herein, as a method of achieving a different auxiliary-heat-source temperature, the front surface of the auxiliary heat source may be covered by a shutter or the like having a temperature different from that of the auxiliary heat source and may be opened and closed, instead of changing the auxiliary-heat-source temperature in a step form. In this case, $L_{Heat\text{-}source,2}$ is a value obtained by combining the thermal radiation radiated by the shutter with the reflected radiance from the surroundings by the shutter.

Next, a second invention will be described.

Similarly to the first invention, as shown in FIG. 1, the auxiliary heat source 2 such as a surface blackbody is disposed at a position specular to the thermal imaging device 3 with respect to a measuring surface. The thermal radiation from the auxiliary heat source 2 is reflected on the surface of the object 1 to be measured, superimposed on thermal radiation from the object 1 to be measured, and detected by the thermal imaging device 3.

At this time, since the relation of reflectance+emissivity=1 is established in an opaque surface from the Kirchhoff's law, the reflectance of the low-emissivity portion is higher. When the temperature of the auxiliary heat source is changed in this state, the radiance distribution changes, and the radiances of the high-emissivity portion and the low-emissivity portion increase with a rise in the auxiliary-heat-source temperature. However, in the way of the increase, the low-emissivity portion having high reflectance increases, and the difference between the radiances decreases. When the auxiliary-heat-source temperature is further increased, the difference between the radiances is no longer present, and thus the pattern due to the emissivity distribution of an image detected by the thermal imaging device disappears. When the heat-source temperature is further increased, the distributions of the radiances are inverted. Thus, the radiance of the low-emissivity portion becomes higher than that of the high-emissivity portion, and an emissivity distribution pattern comes in sight again. The object temperature is obtained: by detecting the radiance when the difference between the radiances is not present, that is, the emissivity distribution pattern of the image disappears; and by applying the Planck's law of radiation, treating the object as a blackbody of which the emissivity is 1. Thus, the true temperature of the object can be found without the need for finding the object emissivity distribution.

The measurement principle of the second invention will be described below in detail.

Let the emissivity of the high-emissivity portion of the object to be measured that has an emissivity distribution to be $\epsilon_{Hi}$, and the emissivity of the low-emissivity portion to be $\epsilon_{Lo}$.

The thermal radiances $S_{Hi}$ and $S_{Lo}$ of the high-emissivity portion and the low-emissivity portion are expressed by the following expressions, respectively.

$$S_{Hi}=\epsilon_{Hi}L(T)$$

$$S_{Lo}=\epsilon_{Lo}L(T)$$

Herein, L(T) is the thermal radiance of a blackbody of temperature T.

Next, an auxiliary heat source of radiance $L_{Heat\text{-}source}$ is installed, and radiation of the auxiliary heat source is superimposed on the object radiation. The radiances detected by the thermal imaging device are given as follows.

$$S_{Hi} = \epsilon_{Hi} L(T) + \rho_{Hi} L_{Heat\text{-}source}$$

$$S_{Lo} = \epsilon_{Lo} L(T) + \rho_{Lo} L_{Heat\text{-}source}$$

Herein, the reflectance of the high-emissivity portion is set to $\rho_{Hi}$, and the reflectance of the low-emissivity portion is set to $\rho_{Lo}$.

Herein, the auxiliary-heat-source radiance $L_{Heat\text{-}source}$ is regulated so that the high-emissivity portion and the low-emissivity portion are equal to each other.

That is, from $S_{Hi} = S_{Lo}$ $$\epsilon_{Hi} L(T) + \rho_{Hi} L_{Heat\text{-}source} = \epsilon_{Lo} L(T) + \rho_{Lo} L_{Heat\text{-}source}$$

When $-L(T)$ is added to both sides of the above expression, and then the expression is transformed using the relations of $\epsilon_{Hi} + \rho_{Hi} = 1$ and $\epsilon_{Lo} + \rho_{Hi} = 1$ obtained from the Kirchhoff's law, the following expression is obtained.

$$\rho_{Hi}(-L(T) + L_{Heat\text{-}source}) = \rho_{Lo}(-L(T) + L_{Heat\text{-}source})$$

Due to the relation of $\rho_{Hi} \neq \rho_{Lo}$, the equal sign is established when $L(T) = L_{Heat\text{-}source}$.

At this time, since the following expression is established $$S_{Hi} = S_{Lo} = \epsilon_{Hi} L(T) + \rho_{Hi} L(T) = \epsilon_{Lo} L(T) + \rho_{Lo} L(T) = L(T)$$

the measured radiance $S_{Hi} = S_{Lo}$ is equal to the radiance from a blackbody of the same temperature T as that of the object, and the accurate temperature T is obtained from the measured radiance $S_{Hi} = S_{Lo}$ by treating the emissivity as 1.

The emissivity distribution of the object focused on the first and second inventions may be, for example, a metal interconnect pattern on a circuit substrate or a device, a pattern caused by a fine structure distribution of the device. In addition, when the usable emissivity distribution is not present, a coating material, a metal film or the like may be coated or pasted on the object surface.

First Embodiment

An embodiment of the first invention will be described below. The thermal imaging device captures a two-dimensional thermal image with a focus on a surface to be measured. Here, an object to be measured is a print circuit board, a semiconductor device or the like. A surface blackbody device of which the surface is blackened is used as the auxiliary heat source. First of all, thermal images are taken when changing the temperature of the auxiliary heat source in a step form while the object temperature is maintained approximately constant, or opening and closing the shutter that covers the front surface of the auxiliary heat source. Next, in the thermal images obtained, one place is selected from each of the high-emissivity portion and the low-emissivity portion which are so close as to be regarded to be isothermal. The radiances of the high-emissivity portion and the low-emissivity portion of the 2-level thermal image are obtained, the reflectance ratio $R_\rho$ is obtained on the basis of Expression (5), and the radiance $L(T)$ is further obtained using Expression (9). The object temperature is obtained from the radiance measured at this time treating the emissivity as 1.

Figure 2:
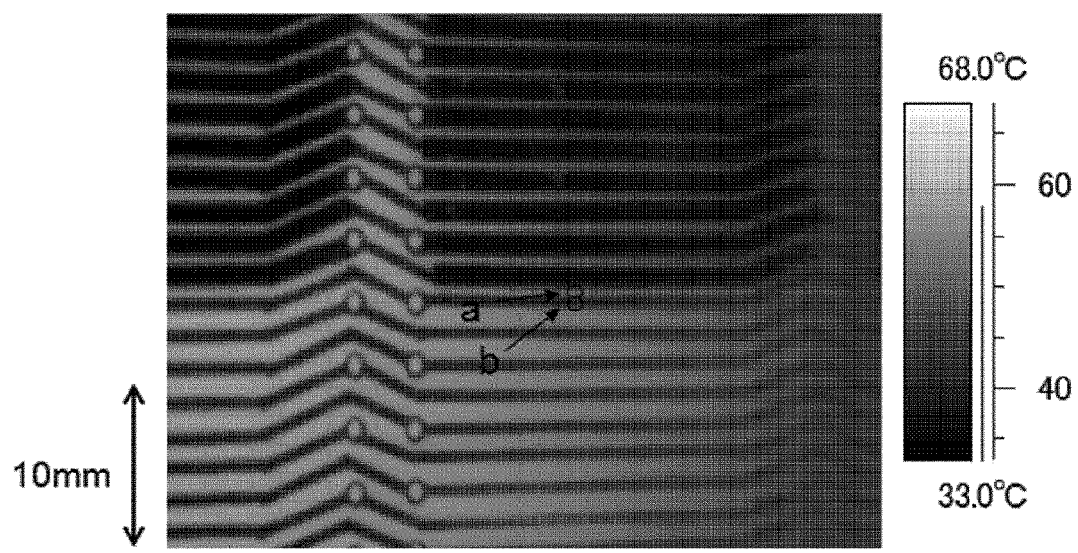
FIG. 2 is a diagram illustrating a thermal image when the auxiliary-heat-source temperature is lower than the object temperature.
Figure 3:
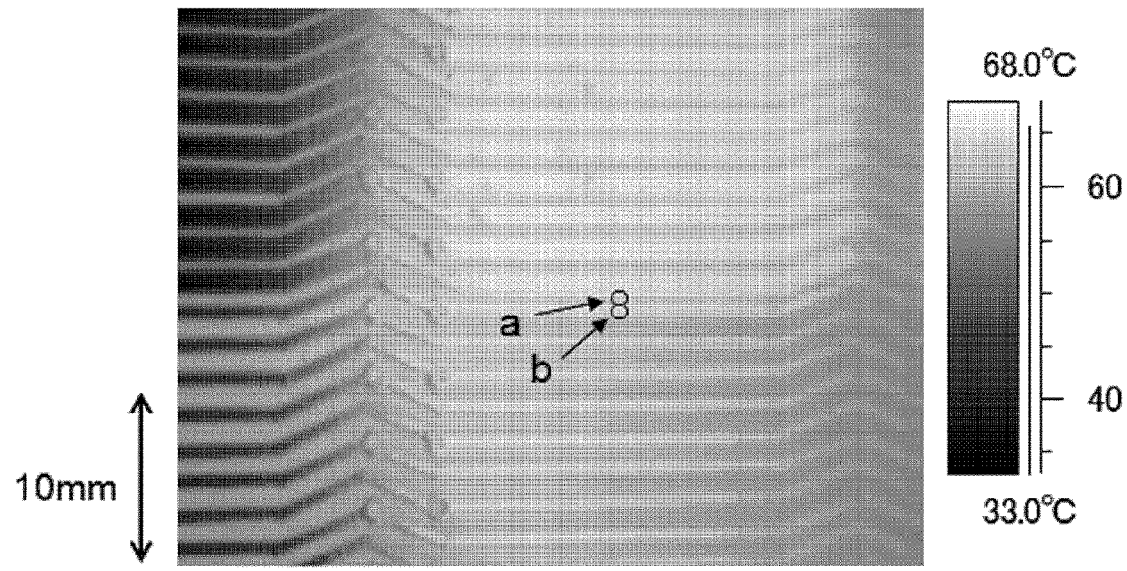
FIG. 3 is a diagram illustrating a thermal image when the auxiliary-heat-source temperature is higher than the object temperature.

Examples of the thermal images obtained when the temperature of the auxiliary heat source is changed in a step form are shown in FIGS. 2 and 3.

FIG. 2 is a diagram illustrating the thermal image when the auxiliary-heat-source temperature is lower than the object temperature. A high-emissivity portion a which is a resin material of a print circuit board appears bright with high radiance, and a metal interconnect pattern appears dark with low radiance as the low-emissivity portion b.

FIG. 3 is a diagram illustrating the thermal image when the auxiliary-heat-source temperature is higher than the object temperature. FIG. 3 shows that the high-emissivity portion a is dark, the low-emissivity portion b shines bright, and brightness and darkness are inverted in comparison with those in the image of FIG. 2. Here, the auxiliary-heat-source temperature is not required to be higher than the object temperature, and the present measurement principle is established even when the auxiliary-heat-source temperature is lower than that.

In this example, the measured radiance temperature of the high-emissivity portion a in FIG. 2 is 51° C., and the radiance temperature of the low-emissivity portion b is 40° C. In addition, the radiance temperature of the high-emissivity portion a in FIG. 3 is 62° C., and the radiance temperature of the low-emissivity portion b is 65° C. After conversion from the temperatures to the radiances $S_{Hi,1}$, $S_{Lo,1}$, $S_{Hi,2}$, and $S_{Lo,2}$, the calculation of the reflectance ratio $R_\rho$ by Expression (5) shows 0.47, and a true temperature of 60° C. can be accurately obtained by further calculation based on Expression (9).

It can be seen from FIG. 2 that the apparent radiance temperature is measured to be different by the fineness of the pattern even in the same material. For example, a metal pattern portion has a low emissivity, and thus a low radiance temperature is detected. Among them, comparison of a portion having a large line width and a portion having a small line width reveals that a high radiance temperature is detected in the portion having a small line width, and a low radiance temperature is detected in the portion having a large line width. This is caused by a phenomenon called a size-of-source effect in which light of the adjacent high-emissivity portion is leaked and detected due to the limitations of the imaging capabilities of the thermal imaging device. Similarly, in the high-emissivity portion, a pattern portion having a small line width is observed to be dark due to light leaking into an adjacent low radiance pattern portion. Observation of FIG. 3 reveals that, similarly to FIG. 2, the fine line portion of the high radiance portion is dark, and the fine line portion of the low radiance portion is bright, although the high-emissivity portion and the low-emissivity portion are inverted.

In this manner, generally, the size-of-source effect changes the apparent radiance temperature, and thus obstructs an accurate temperature measurement. In response to such a problem, the following describes that the present invention can eliminate the influence.

The increase and decrease in the radiance due to the size-of-source effect are proportional to the radiance difference between the high-emissivity portion and the low-emissivity portion. As the proportional ratio, the radiance is observed to decrease by $r_{Hi}$ in the high-emissivity portion a which is a measurement place of the fine line portion, and the radiance is observed to increase by $r_{Lo}$ in the low-emissivity portion b.

Herein, $r_{Hi}$ and $r_{Lo}$ are coefficients that represent the size-of-source effect. The following expressions are obtained by rewriting Expressions (1) to (4) in consideration of the size-of-source effect.

$$S_{Hi,1} = (1 - r_{Hi})(\epsilon_{Hi} L(T) + \rho_{Hi} L_{Heat\text{-}source,1}) + r_{Hi}(\epsilon_{Lo} L(T) + \rho_{Lo} L_{Heat\text{-}source,1})$$

$$S_{Lo,1} = (1 - r_{Lo})(\epsilon_{Lo} L(T) + \rho_{Lo} L_{Heat\text{-}source,1}) + r_{Lo}(\epsilon_{Hi} L(T) + \rho_{Hi} L_{Heat\text{-}source,1})$$

$$S_{Hi,2} = (1 - r_{Hi})(\epsilon_{Hi} L(T) + \rho_{Hi} L_{Heat\text{-}source,2}) + r_{Hi}(\epsilon_{Lo} L(T) + \rho_{Lo} L_{Heat\text{-}source,2})$$

$$S_{Lo,2} = (1 - r_{Lo})(\epsilon_{Lo} L(T) + \rho_{Lo} L_{Heat\text{-}source,2}) + r_{Lo}(\epsilon_{Hi} L(T) + \rho_{Hi} L_{Heat\text{-}source,2})$$

When $R_\rho$ is calculated similarly to Expression (5), the following expression is obtained.

$$R_\rho=(S_{Hi,2}-S_{Hi,1})/(S_{Lo,2}-S_{Lo,1})=((1-r_{Hi})\rho_{Hi}+r_{Hi}\rho_{Lo})/((1-r_{Lo})\rho_{Lo}+r_{Lo}\rho_{Hi})$$

On the other hand, when transformation is performed similarly to Expressions (6) and (7), $S_{Hi,2}$ and $S_{Lo,2}$ are as follows.

$$S_{Hi,2}=(1-r_{Hi})(L(T)-\rho_{Hi}(L(T)-L_{Heat\text{-}source,2}))+r_{Hi}(L(T)-\rho_{Lo}(L(T)-L_{Heat\text{-}source,2}))=L(T)-\rho_{Hi}((1-r_{Hi})+\rho_{Lo}r_{Hi})(L(T)-L_{Heat\text{-}source,2})$$

$$S_{Lo,2}=L(T)-\rho_{Lo}((1-r_{Lo})+\rho_{Hi}\,r_{Lo})(L(T)-L_{Heat\text{-}source,2})$$

When transformation is performed similarly to the derivation of Expression (8), the relation of $(S_{Hi,2}-L(T))/(S_{Lo,2}-L(T))=R_\rho$ is obtained.

This is the same as Expression (8). Accordingly, the true temperature T can be obtained by obtaining the blackbody radiation L(T) using (9) expression. This shows that, even when the apparent radiance temperature changes due to the size-of-source effect, the accurate temperature can be measured without being influenced by the effect.

Second Embodiment

An embodiment of the second invention will be described below. The thermal imaging device captures a two-dimensional thermal image with a focus on a surface to be measured. Here, an object to be measured is a print circuit board, a semiconductor device or the like. A surface blackbody device of which the surface is blackened is used as the auxiliary heat source. In this state, while the object temperature is maintained approximately constant and the temperature of the auxiliary heat source is changed, the thermal image is measured to find out conditions in which a pattern of the thermal image caused by the emissivity distribution of the object to be measured disappears.

The object temperature is obtained from the radiance measured at this time treating the emissivity as 1. When the emissivity of the auxiliary heat source is sufficiently close to 1, the object temperature may be obtained by measuring the auxiliary-heat-source temperature using a contact-type thermometer or the like.

Figure 4:
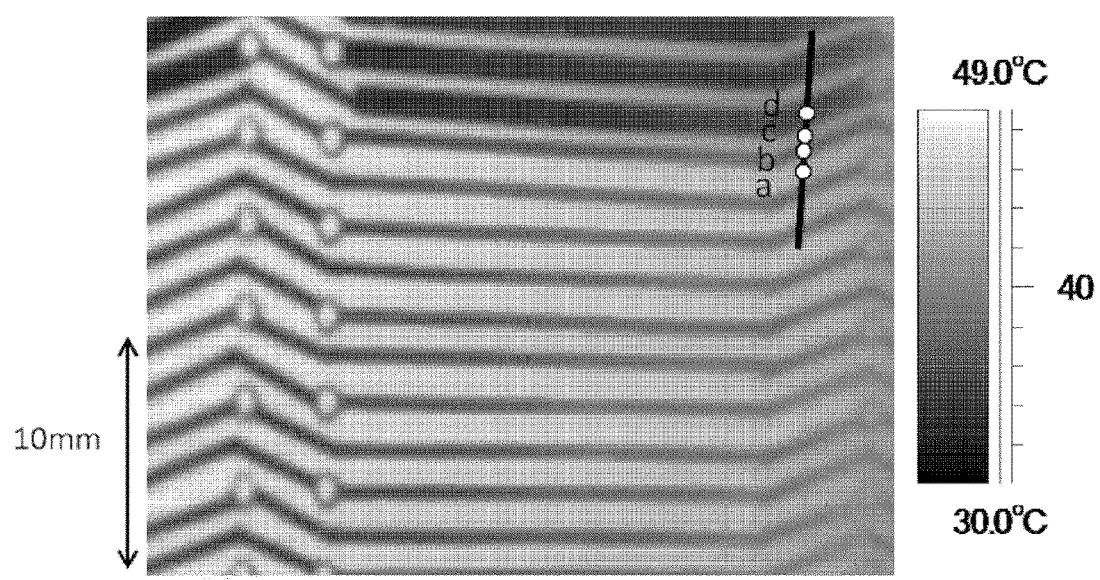
FIG. 4 is an explanatory diagram of a non-contact measuring method of surface temperature according to the present invention.
Figure 5:
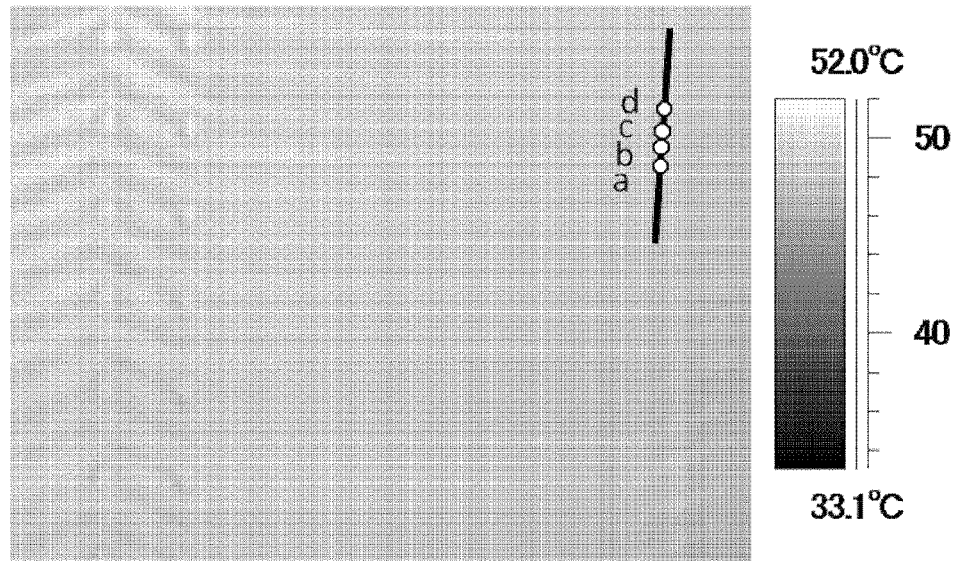
FIG. 5 is a diagram illustrating an image in which the pattern disappears.
Figure 6:
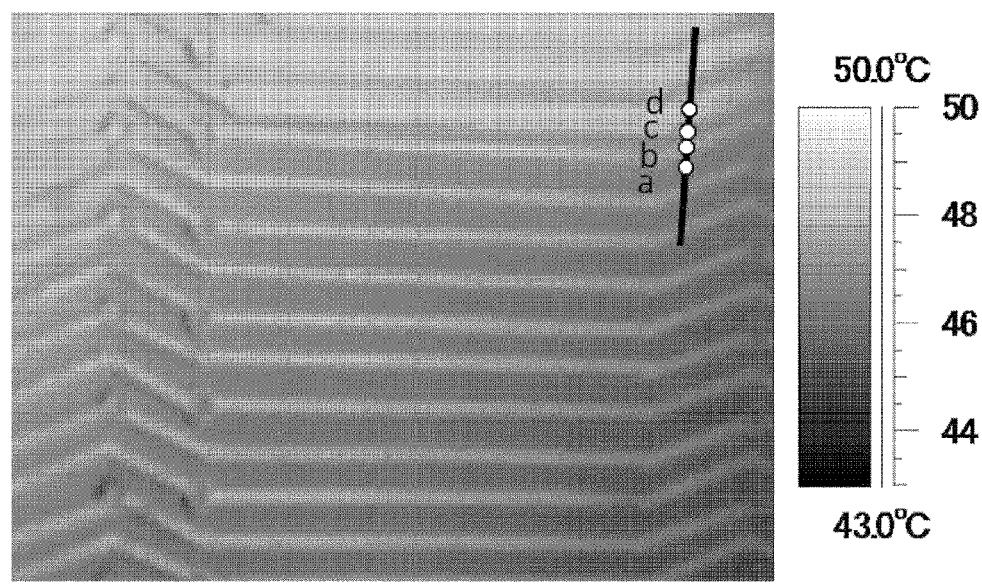
FIG. 6 is a diagram illustrating an image in which brightness and darkness are inverted.

Examples of the thermal images obtained when the temperature of the auxiliary heat source is raised are shown in FIGS. 4 to 6.

In FIG. 4, the auxiliary-heat-source temperature is lower than the object temperature, the high-emissivity portion which is a resin material of a print circuit board appears bright with high radiance, and a metal interconnect pattern appears dark with low radiance as the low-emissivity portion.

FIG. 5 is a diagram illustrating the thermal image when the auxiliary-heat-source temperature is raised and the radiances of the high-emissivity portion and the low-emissivity portion become equal to each other. It is seen that the pattern disappears.

FIG. 6 is a diagram illustrating the thermal image when the auxiliary-heat-source temperature becomes higher than the object temperature. FIG. 6 shows that the high-emissivity portion is dark, the low-emissivity portion shines bright, and brightness and darkness are inverted in comparison with those in the image of FIG. 4.

Figure 7:
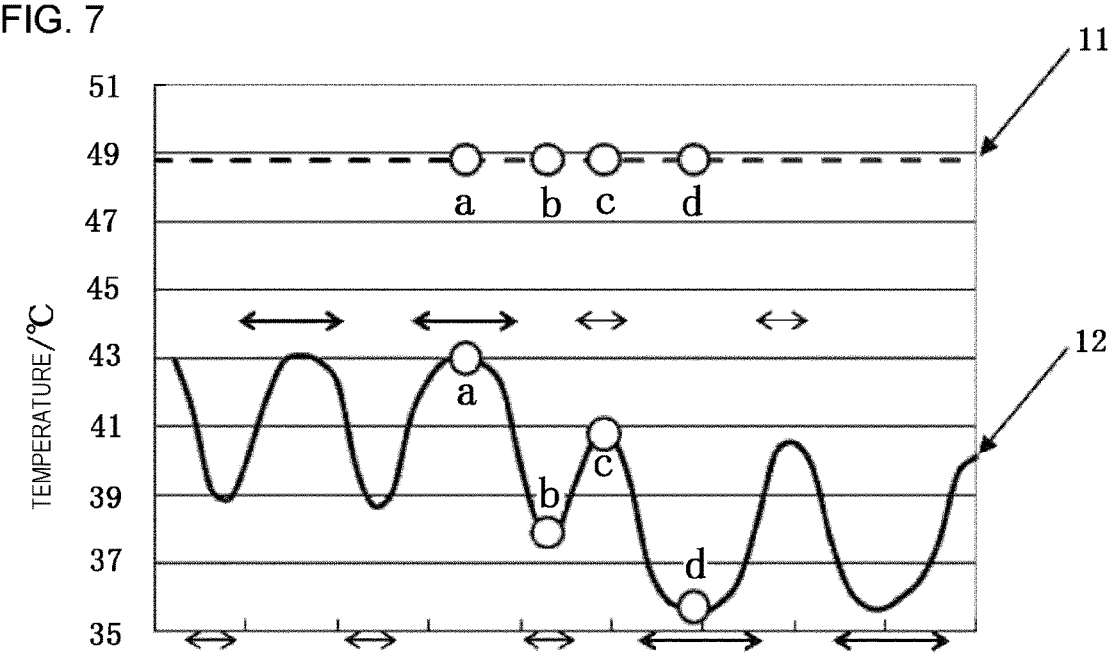
FIG. 7 is a diagram illustrating a radiance variation pattern taken along a drawn line.

FIG. 7 shows a radiance variation pattern (see 12 in FIG. 7) taken along a line drawn in FIG. 4. The vertical axis denotes the radiance temperature. This portion of the pattern includes portions (a and b) having a thin high-emissivity portion and a thick low-emissivity portion, and to the contrary, portions (c and d) having a thick high-emissivity portion and a thin low-emissivity portion. Originally, the radiance temperature of the high-emissivity portion is 43° C., and the radiance temperature of the low-emissivity portion is approximately 35° C. Where the line is thin, the high-emissivity portion c appears to have lower emissivity than a (the radiance temperature is lower), and low-emissivity portion b appears to have higher emissivity than d (the radiance temperature is higher). This is caused by the imperfection of the imaging characteristics of the thermal imaging device. This shows that significant radiance blurring occurs at the time of the temperature measurement, even at the level at which blurring is not obviously recognized in the image. In this state, a temperature lower than the true temperature is obtained when a temperature is obtained by applying the known emissivity of the high-emissivity portion to the portion c, and a high temperature is measured when the known emissivity of the low-emissivity portion is applied to the portion b.

On the other hand, a radiance distribution pattern (see 11 in FIG. 7), shown in FIG. 7, which corresponds to FIG. 5 is uniform, and an accurate measurement temperature of 49° C. is shown regardless of a place. This shows that an accurate temperature can be measured without being influenced, not only when the emissivity of the object to be measured is unknown, but also in the temperature measurement of an object having a minute emissivity distribution pattern exceeding the limitations of the imaging resolution capabilities of the thermal imaging device.

In the first and second embodiments, the surface blackbody device is used as the auxiliary heat source, but the auxiliary heat source is not limited thereto. For example, any auxiliary heat sources may be used, provided that the surface of the light source is sufficiently large with respect to the object to be measured, and the radiance is uniform and variable (e.g., an integrating sphere including a lamp light source or a laser light source, a liquid temperature bath surface, a planar heater, or the like).

In addition, in cases where the thermal imaging device measures a high-temperature object, the thermal imaging device may also be a camera such as a CCD that measures visible light and near infrared light. In addition, measurement by a linear sensor may be used instead of using a two-dimensional image.

REFERENCE NUMERALS

1: OBJECT TO BE MEASURED
2: AUXILIARY HEAT SOURCE
3: THERMAL IMAGING DEVICE

The invention claimed is:

1. A method of measuring surface temperature, comprising:
   preparing a surface to be measured that has an emissivity distribution, a radiometer that measures a radiance distribution of the surface to be measured, and an auxiliary heat source installed in a specular reflection position from the radiometer with respect to the surface to be measured;
   measuring a first radiance of a first place of the surface to be measured and a second radiance of a second place of the surface to be measured, wherein the second place has an emissivity different from an emissivity of the first place, and the second radiance is measured at an auxiliary-heat-source temperature the same as an auxiliary-heat-source temperature at which the first radiance is measured;

measuring a third radiance of the first place of the surface to be measured, and a fourth radiance of the second place of the surface to be measured, and the fourth radiance is measured at an auxiliary-heat-source temperature the same as an auxiliary-heat-source temperature at which the third radiance is measured and is different from an auxiliary-heat-source temperature at which the first radiance is measured;

calculating a reflectance ratio between the first place and the second place on the basis of the first radiance, the second radiance, the third radiance and the fourth radiance;

after calculating the reflectance ratio, measuring a fifth radiance of the first place of the surface to be measured, and a sixth radiance of the second place of the surface to be measured, wherein the sixth radiance is measured at an auxiliary-heat-source temperature the same as an auxiliary-heat-source temperature at which the fifth radiance is measured; and obtaining a temperature of the surface to be measured, using the reflectance ratio, the fifth radiance and the sixth radiance.

2. A system of measuring surface temperature, comprising:

a surface to be measured that has an emissivity distribution;

a radiometer that measures a radiance distribution of the surface to be measured; and an auxiliary heat source installed in a specular reflection position from the radiometer with respect to the surface to be measured, wherein a first radiance of a first place of the surface to be measured is measured, and a second radiance of a second place of the surface to be measured is measured, wherein the second place has an emissivity different from an emissivity of the first place, and the second radiance is measured at an auxiliary-heat-source temperature the same as an auxiliary-heat-source temperature at which the first radiance is measured, wherein a third radiance of the first place of the surface to be measured is measured, and a fourth radiance of the second place of the surface to be measured is measured, and the fourth radiance is measured at an auxiliary-heat-source temperature the same as an auxiliary-heat-source temperature at which the third radiance is measured and is different from an auxiliary-heat-source temperature at which the first radiance is measured, a reflectance ratio between the first place and the second place on the basis of the first radiance, the second radiance, the third radiance and the fourth radiance, after the reflectance ratio is calculated, a fifth radiance of the first place of the surface to be measured is measured, and a sixth radiance of the second place of the surface to be measured is measured, wherein the sixth radiance is measured at an auxiliary-heat-source temperature the same as an auxiliary-heat-source temperature at which the fifth radiance is measured, and a temperature of the surface to be measured is obtained using the calculated reflectance ratio, the fifth radiance and the sixth radiance.

3. The system of measuring surface temperature according to claim 2, wherein the radiometer that measures a radiance distribution is a thermal imaging device or a one-dimensional scanning radiometer.

* * * * *